US009479916B2

(12) United States Patent
Agulnik et al.

(10) Patent No.: US 9,479,916 B2
(45) Date of Patent: Oct. 25, 2016

(54) METHOD AND APPARATUS FOR PROVIDING ACCESS TO LOCAL SERVICES AND APPLICATIONS TO MULTI-AGENCY RESPONDERS

(71) Applicant: MOTOROLA SOLUTIONS, INC., Schaumberg, IL (US)

(72) Inventors: Anatoly Agulnik, Deerfield, IL (US); Lin Lin, Fox River Grove, IL (US); Kevin J. O'Connell, Palatine, IL (US); Michael D. Pearce, Barrington, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 78 days.

(21) Appl. No.: 14/667,142

(22) Filed: Mar. 24, 2015

(65) Prior Publication Data
US 2016/0192165 A1 Jun. 30, 2016

Related U.S. Application Data

(60) Provisional application No. 62/098,594, filed on Dec. 31, 2014.

(51) Int. Cl.
| H04M 11/04 | (2006.01) |
| H04W 4/22 | (2009.01) |
| H04W 76/00 | (2009.01) |
| H04W 48/04 | (2009.01) |

(Continued)

(52) U.S. Cl.
CPC ............ *H04W 4/22* (2013.01); *H04W 12/06* (2013.01); *H04W 48/04* (2013.01); *H04W 76/007* (2013.01); *H04W 88/04* (2013.01)

(58) Field of Classification Search
CPC .. H04L 9/3213; H04L 9/3226; H04W 12/06; H04W 12/08; H04W 4/22
See application file for complete search history.

(56) References Cited

U.S. PATENT DOCUMENTS

| 5,752,041 A | 5/1998 | Fosdick |
| 7,924,709 B2 * | 4/2011 | Lynn ............... G06F 21/00 370/230 |

(Continued)

FOREIGN PATENT DOCUMENTS

| WO | 2013019551 A1 | 2/2013 |
| WO | 2014105336 A1 | 7/2014 |
| WO | 2014105349 A1 | 7/2014 |

OTHER PUBLICATIONS

The International Search Report and the Written Opinion, PCT/US2015/065300, filed: Dec. 11, 2015, mailed: Mar. 2, 2016, all pages.

*Primary Examiner* — Shantell L Heiber

(57) ABSTRACT

A mobile device, associated with a responder of the visiting agency and present in the geographical jurisdiction of the local agency, maintains a first mutual aid token associated with the local agency, wherein the mutual aid token authorizes the first responder to access the local agency and wherein the mutual aid token is associated with a transferability time period, that is, a time during which the mutual aid token can be transferred from one mutual aid responder to another. The mobile device identifies another mobile device of another responder associated with the visiting agency and transfers to the another mobile device, without a need to first contact the local or visiting agencies, a mutual aid token that is derived from the first mutual aid token, wherein the transferred mutual aid token authorizes the another responder to access the local agency.

18 Claims, 4 Drawing Sheets

(51) Int. Cl.
*H04W 12/06* (2009.01)
*H04W 88/04* (2009.01)

(56) References Cited

U.S. PATENT DOCUMENTS

| | | |
|---|---|---|
| 8,271,536 B2 | 9/2012 | Amradkar et al. |
| 8,341,718 B2 | 12/2012 | Chow et al. |
| 8,712,056 B2 | 4/2014 | Hall |
| 8,739,263 B2 | 5/2014 | Azuma |
| 8,744,480 B2 | 6/2014 | Daly |
| 8,755,784 B2 | 6/2014 | Richardson |
| 8,776,204 B2 | 7/2014 | Faynberg et al. |
| 2007/0205888 A1* | 9/2007 | Lee .................. G08B 13/19656 340/539.18 |
| 2012/0028626 A1 | 2/2012 | Marocchi et al. |
| 2013/0268687 A1 | 10/2013 | Schrecker |
| 2014/0230039 A1 | 8/2014 | Prakash |
| 2015/0161360 A1* | 6/2015 | Paruchuri ............... G06F 21/10 726/27 |

* cited by examiner

METHOD AND APPARATUS FOR PROVIDING ACCESS TO LOCAL SERVICES AND APPLICATIONS TO MULTI-AGENCY RESPONDERS

FIELD OF THE INVENTION

The present invention relates generally to the field of wireless communication systems, and more particularly, to provision of local services and/or applications to visiting responders in a public safety wireless communication network.

BACKGROUND OF THE INVENTION

During an incident in a specific jurisdiction, incoming emergency calls related to the incident are routed to a computer-aided dispatch (CAD) system associated with the jurisdiction where the incident occurred. The CAD associated with the jurisdiction where the incident occurred may assign resources from that jurisdiction, that is, local resources or responders of a local agency, for example, emergency personnel such as firefighters and/or police and/or emergency equipment such as trucks or ambulances, to respond to the incident. However, in some instances, the local resources may be insufficient for responding to the incident and the CAD further may request assistance from resources of other jurisdictions that are needed for responding to the incident. Such resources of other jurisdictions are also known as "mutual aid" resources or responders.

In some instances, there may be no public safety wide area network (WAN) wireless coverage at the incident scene. In such an instance, an Incident Area Network (IAN) may be set up to enable wireless communications among the local responders and to enable the local responders to access local services provided by servers of the local agency or by an emergency response Command VAN of the local agency present at the incident scene. For example, the IAN may be a mesh network that is established utilizing broadband handheld devices and broadband vehicular devices of the local responders. When mutual aid responders arrive at the incident scene, they also may need to join the IAN and access the local services provided by the local agency.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
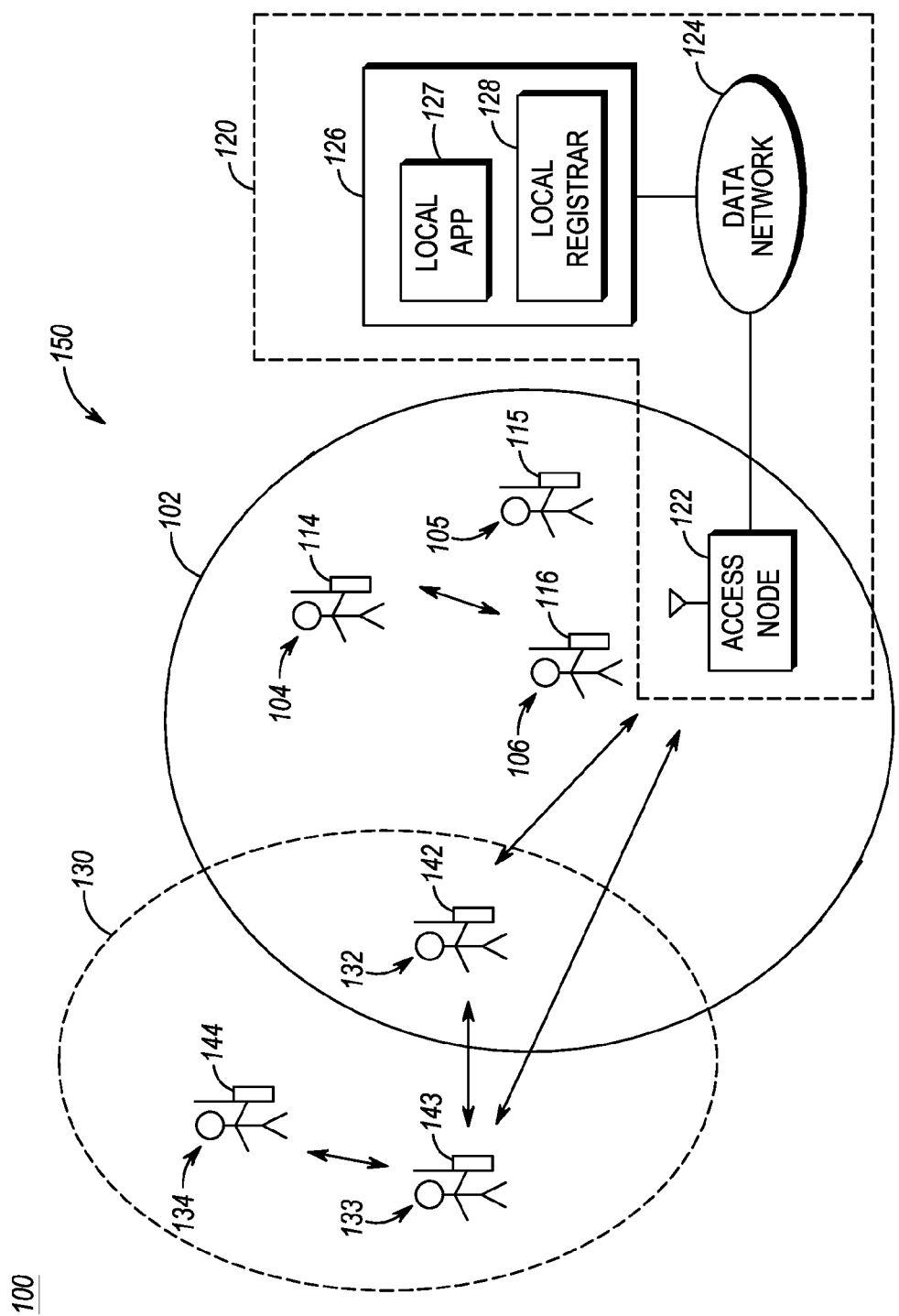
FIG. 1 is a block diagram of a wireless communication system in accordance with some embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method and a mobile device provide for use of local applications and services of a local agency by responders of visiting agencies when providing mutual aid. The mobile device, associated with a responder of the visiting agency and present in the geographical jurisdiction of the local agency, maintains a first mutual aid token associated with the local agency, wherein the mutual aid token authorizes the first responder to access the local agency and wherein the mutual aid token is associated with a transferability time period, that is, a time during which the mutual aid token, or other mutual aid tokens derived from the mutual aid token, can be transferred from one mutual aid responder to another. The mobile device identifies another mobile device of another responder associated with the visiting agency and transfers, to the another mobile device and without a need to first contact the local or visiting agencies, a second mutual aid token that is derived from the first mutual aid token, wherein the second mutual aid token authorizes the another responder to access the local agency. The second mobile device then may use the second mutual aid token to obtain an application token from the local agency and accesses one or more of an application and a service of the local agency based on the application token.

Generally, an embodiment of the present invention encompasses a method for providing local service to a visiting responder in a public safety wireless communication system. The method includes maintaining, by a first mobile device of a first responder associated with a visiting agency and present in a geographical jurisdiction of a local agency different from the visiting agency, a first mutual aid token associated with the local agency, wherein the mutual aid token authorizes the first responder to access the local agency and wherein the mutual aid token is associated with a transferability time period, wherein the transferability time period is a time during which the mutual aid token, or other mutual aid tokens derived from the mutual aid token, can be transferred from one mutual aid responder to another. The method further includes identifying, by the first mobile device, a second mobile device of a second responder associated with the visiting agency and present in the geographical jurisdiction of a local agency and transferring, by the first mobile device to the second mobile device and without a need to contact the local agency subsequent to identifying the second responder, a second mutual aid token that is derived from the first mutual aid token, wherein the second mutual aid token authorizes the second responder to access the local agency.

Another embodiment of the present invention encompasses an apparatus for an apparatus for providing local service to a visiting responder in a public safety wireless communication system. The apparatus includes a first mobile device comprising a processor and an at least one memory device. The at least one memory device is configured to store a set of instructions that, when executed by the processor, cause the processor to perform the following functions when the first mobile device is present in a geographical jurisdiction of a local agency, wherein the local agency is different from a visiting agency associated with a first responder using the first mobile device: maintain a first mutual aid token associated with the local agency, wherein the mutual aid token authorizes the first mobile device to access the local agency and wherein the mutual aid token is associated with a transferability time period, wherein the transferability time period is a time during which the mutual aid token, or other mutual aid tokens derived from the mutual aid token, can be transferred from one mutual aid responder to another; identify a second mobile device of a second responder associated with the visiting agency and present in the geographical jurisdiction of a local agency; and transfer, to the second mobile device and without a need to contact the local agency subsequent to identifying the second responder, a second mutual aid token that is derived from the first mutual aid token, wherein the second mutual aid token authorizes the second responder to access the local agency.

The present invention may be more fully described with reference to FIGS. 1-4B. FIG. 1 is a block diagram of wireless communication system 100 in accordance with an embodiment of the present invention. Wireless communication system 100 comprises an Incident Area Network (IAN) 102 that provides wireless communication services to local responders 104-106 at an incident scene 150 via one or more access nodes 122 (one shown), such as a base station (BS), a Node B, an evolved NodeB (eNB), a local area network (LAN) access point (AP), or a mobile device of one of the responders that is operating as a mesh network relay device. Local responders 104-106 are all associated with a local public safety agency, for example, an agency having jurisdiction over a geographical area that includes incident scene 150. In various embodiments of the present invention, IAN 102 may be a local area network (LAN) serviced by access node 122 and/or may comprise a mesh network that is established utilizing broadband user mobile devices 114-116 of the local responders 104-106, such as broadband handheld devices or broadband vehicular devices. For example, mobile device 114 of local responder 104 may communicate with access node 122 via a mobile device of another responder, such as user mobile device 116 of local responder 106.

IAN 102 enables the local responders 104-106 to access local applications and services 127, that is, applications and services that are provided by one or more servers 126 (one shown) of the local agency. In one such embodiment, the one or more servers 126 may be remote servers operated the local agency and accessible by mobile devices 114-116 of local responders 104-106 via access node 122 and a data network 124. In another such embodiment, the one or more servers 126 may be co-located with access node 122 in a command VAN present at incident scene 150. The one or more servers 126, access node 122, and any other elements of an infrastructure of a network 120 of the local agency, such as an element implementing a registrar 128 of the local agency if other than the one or more servers 126, are also referred to herein as network elements of the local agency.

When identifying resources (for example, emergency responders such as local responders 104-106) available for responding to a local incident, the local agency may determine that there are insufficient resources (that is, a resource gap) within the local jurisdiction to adequately respond to the incident. Subsequent to identifying the resource insufficiency, the local agency may determine that another agency (that is, a visiting agency) has the resources necessary to fill the resource gap. The visiting agency may be in a network that covers a different jurisdiction. In order to adequately provide all the resources required for responding to the incident, the local agency may request "mutual aid" resources, such as additional emergency responders, from the visiting agency. The local agency and the visiting agency then may assign responders/mobile devices of the visiting agency, such as visiting responders 132-134 and their corresponding mobile devices 142-144, to provide the mutual aid needed to adequately respond to the incident.

Figure 2:
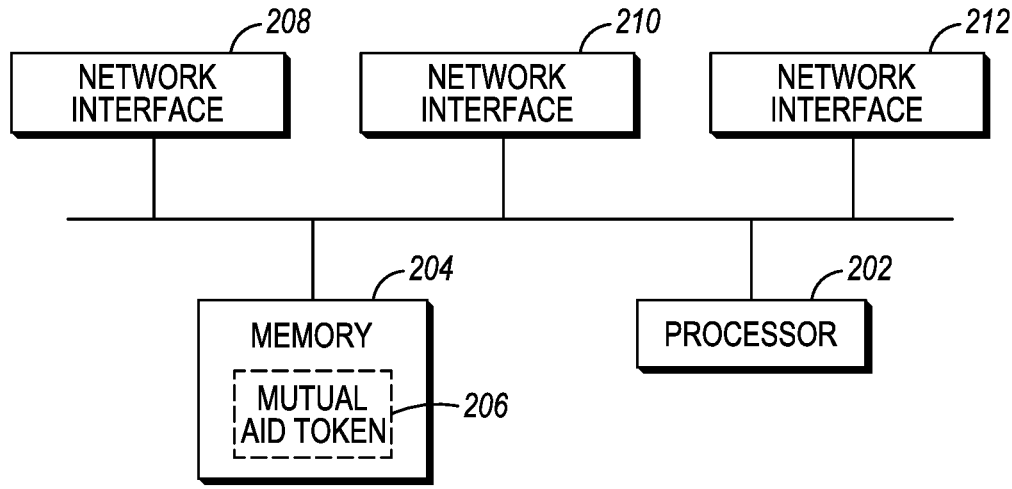
FIG. 2 is a block diagram of a mobile station of the communication system of FIG. 1 in accordance with some embodiments of the present invention.
Figure 3:
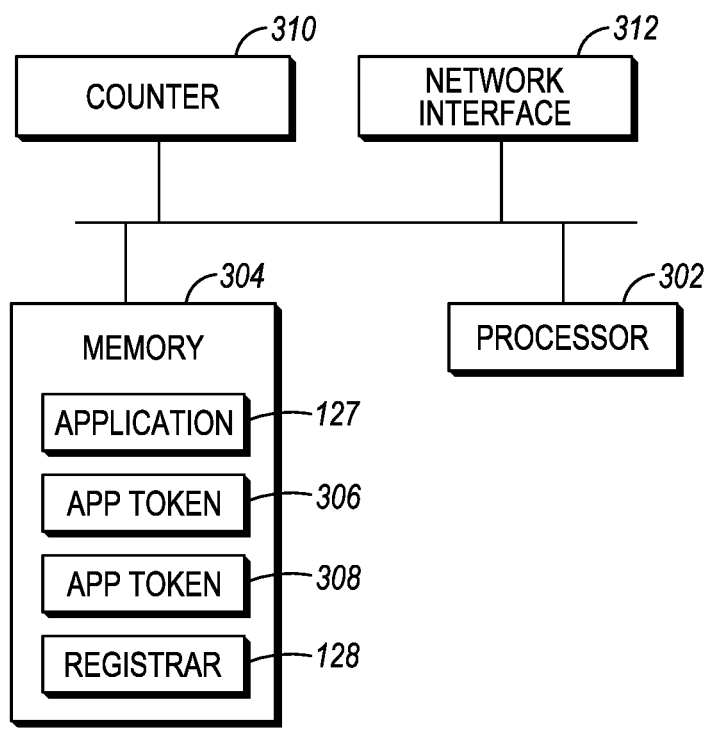
FIG. 3 is a block diagram of a server of the communication system of FIG. 1 in accordance with some embodiments of the present invention.

Referring now to FIGS. 2 and 3, block diagrams are provided of each of a mobile device 200, such as mobile devices 114-116 and 142-144, and server 126 in accordance with some embodiments of the present invention. Each of mobile device 200 and server 126 operates under the control of a respective processor 202, 302 such as one or more microprocessors, microcontrollers, digital signal processors (DSPs), combinations thereof or such other devices known to those having ordinary skill in the art. Each processor 202, 302 operates the corresponding mobile device according to data and instructions stored in a respective at least one memory device 204, 304 such as random access memory (RAM), dynamic random access memory (DRAM), and/or read only memory (ROM) or equivalents thereof, that stores a set of instructions, such as data and programs, that may be executed by the corresponding processor so that the user mobile device and server may perform the functions described herein. The at least one memory device 204 of mobile device 200 further maintains a mobile device identifier (ID), that is, an identifier that uniquely identifies the mobile device in communication system 100, and further may maintain a user ID that uniquely identifies the user of mobile device in communication system 100. For example, the user ID may be pre-configured into the mobile device or may be input, by a user to the mobile device when the user acquires the mobile device, for example, at the beginning of a work shift.

Unless otherwise specified herein, the functionality described herein as being performed by a mobile device 114-116 and 142-144 and server 126 is implemented with or in software programs and instructions stored in the respective at least one memory device 204, 304 of the mobile device and server and executed by the associated processor 202, 302 of the mobile device and server.

The at least one memory device 304 of server 126 further includes programs and instructions that, when executed by processor 302, implement one or more applications or services 127, for example, a Push-to-Talk service or a video distribution service, and a local registrar 128. However, in other embodiments of the present invention, local registrar 128 may be implemented by a network element separate from, and accessible by, server 126. Further, server 126 may maintain, in at least one memory device 304, one or more application tokens 306, 308 (two shown) associated with the one or more applications or services 127 and that permit access to the one or more applications or services. However, in another embodiment of the present invention, the one or more application tokens 306, 308 may be generated by processor 302 of server 126 on an 'as needed' basis.

Each of mobile device 200 and server 126 further includes one or more network interfaces in communication with their corresponding processor. For example, mobile device 200 may include a first wireless network interface 208 in communication with processor 202 and for directly communicating with another mobile device via a proximity-based wireless protocol, such as a Near Field Communication (NFC) or Bluetooth® protocol, a second wireless network interface 210 in communication with processor 202 and for communicating with access node 122 and other mobile devices via a short range protocol, for example, a local area network (LAN) protocol or, again, a Bluetooth® protocol, and a third wireless network interface 212 in communication with processor 202 and supporting wide area network (WAN) communications. Server 126 includes one or more network interfaces 312 for connecting to data network 122 and, via the data network, to other devices of communication system 100, such as mobile devices 114-116 and 142-144. The one or more network interfaces 312 may include a wireless, a wireline, and/or an optical interface that is capable of conveying messaging, such as data packets, to, and receiving messaging from, communication network 122.

One or more of the visiting agency responders 132-134, such as responder 132, is an authorized visiting responder, that is, a visiting responder who has been authorized by the local agency or the local agency authorized user to access the applications and services, such as application 127, of the local agency when providing mutual aid. Mobile device 142 of authorized visiting responder 132 includes a mutual aid token 206 that is stored in the at least one memory device 204 of the mobile device. Mutual aid token 206, and mutual aid tokens derived from mutual aid token 206, permits, that is, authorizes, a mobile device possessing the token, such as mobile device 142, to access the local agency's network 120 when visiting the local agency to provide mutual aid. More particularly, when authorized responder 132 arrives at incident scene 150, the responder's mobile device 142 can present mutual aid token 206 to server 126, and in particular to registrar 128. Based on the received mutual aid token, local registrar 128 authenticates mobile device 142 and conveys to the mobile device an application token that authorizes the mobile device to access one or more local applications and services 127.

In one embodiment of the present invention, mobile device 142 of authorized visiting responder 132 may be pre-configured with mutual aid token 206, for example, by the home agency of authorized responder 132. In another embodiment of the present invention, mobile device 142 of authorized responder 132 may get provisioned with mutual aid token 206 upon arriving at incident scene 150. For example, a rank of authorized responder 132 at the home agency of the authorized responder, for example, captain, commander, shift leader, battalion chief, and so on, or a role of the authorized responder at incident scene 150, may entitle the authorized responder, pursuant to rules of the local agency associated with the incident scene, to a mutual aid token 206 upon arrival at the incident scene to provide mutual aid. Mobile device 142 of authorized responder 132 then may be transferred mutual aid token 206 by a mobile device 114-116 of a local agency responder 104-106 that is in possession of the mutual aid token, for example, via a near-field communication and a network interface 208 of each responder's mobile device.

When the visiting agency responders 132-134 arrive at incident scene 150, it may be beneficial to allow the visiting agency responders to access one or more local applications and services 127 available to the local responders 104-106. This can include obtaining security credentials for accessing the local applications and services, collaborating with a workgroup or set of individuals of the local agency, such as local responders 104-106, and/or interoperating with a talkgroup of the local agency, for example, a talkgroup that includes local agency responders 104-106. Communication system 100 provides an expedited and simplified process for authorizing visiting responders to access local applications and services of a local agency when visiting to provide mutual aid and for permitting the visiting responders to access the local agency applications and services. More particularly, communication system 100 provides a scheme whereby a designated responder of the visiting agency can securely authorize other responders of the visiting agency to access the applications and services of the local agency when providing mutual aid.

Figure 4A:
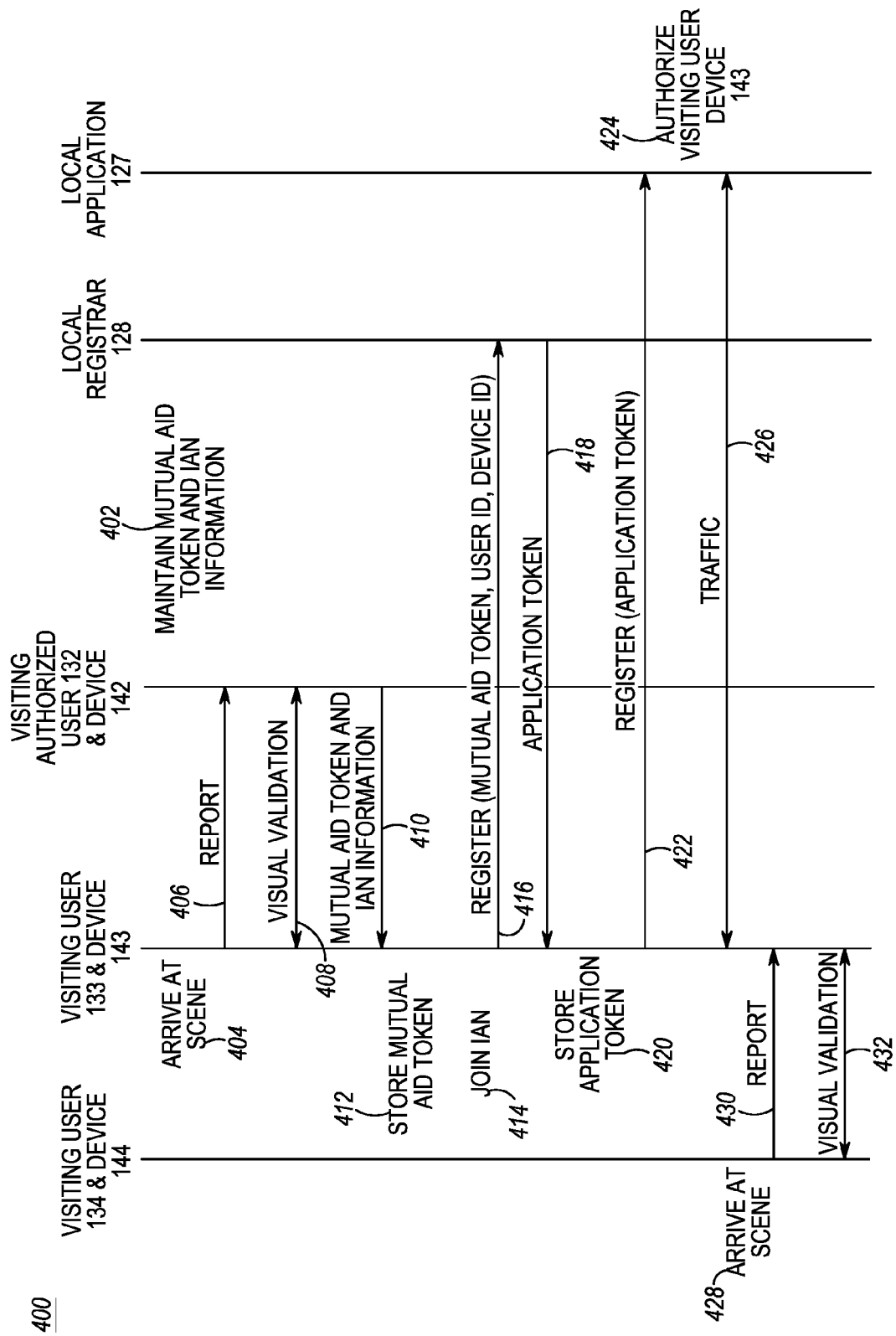
FIG. 4A is a signal flow diagram illustrating a method executed by communication system of FIG. 1 to authorize visiting agency responders to access local agency applications and services in accordance with some embodiments of the present invention.
Figure 4B:
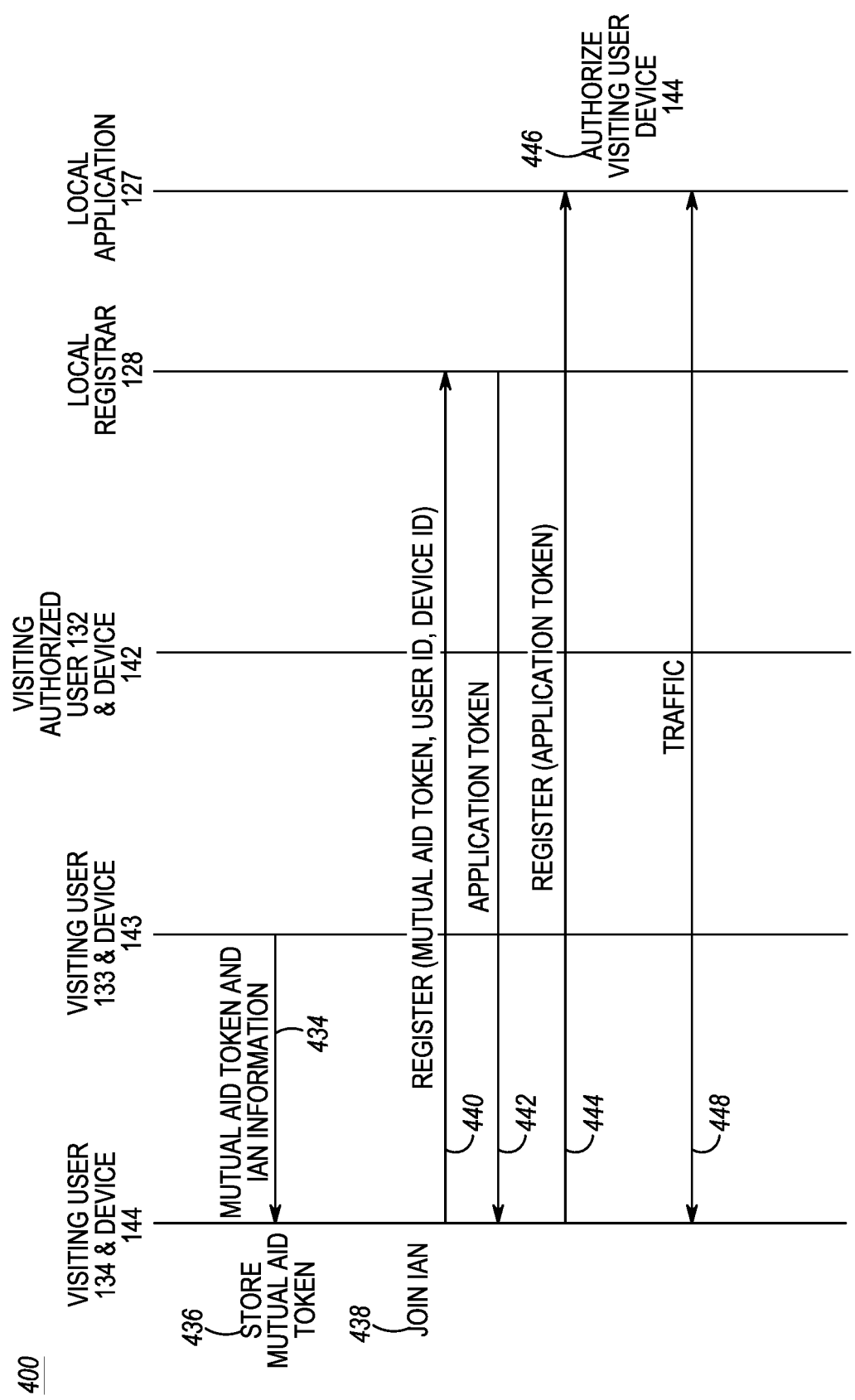
FIG. 4B is a continuation of the signal flow diagram of FIG. 4A illustrating a method executed by communication system of FIG. 1 to authorize visiting agency responders to access local agency applications and services in accordance with some embodiments of the present invention.

Referring now to FIGS. 4A and 4B, a signal flow diagram 400 is provided that illustrates a method executed by communication system 100 to authorize visiting agency responders to access local agency applications and services in accordance with some embodiments of the present invention. Signal flow diagram 400 begins when a first, authorized responder of a visiting agency, for example, a first user 132 and a corresponding first mobile device 142 (hereinafter collectively referred to as 'authorized responder 132'), that is present at an incident scene, that is, incident scene 150, maintains 402, in the at least one memory device 204 of mobile device 142, a first mutual aid token 206. Mobile device 142 may be pre-configured with the first mutual aid token, or the mobile device may be provisioned the first mutual aid token by the local agency upon arriving at incident scene 150. The first mutual aid token permits the mobile device to access applications and services of the local agency when the mobile device is in the geographical jurisdiction of the local agency, for example, at incident scene 150, to provide mutual aid.

At some point in time, a second responder of the visiting agency, such as a second user 133 and a corresponding second mobile device 143 (hereinafter collectively referred to as 'second responder 133'), arrives (404) at incident scene 150 to provide mutual aid. It is assumed herein that the first, authorized responder of the visiting agency, that is, user 132 and corresponding mobile device 142, already is at the incident scene and has joined IAN 102 using the mutual aid token 206 maintained by the authorized responder's mobile device. As part of joining IAN 102, authorized responder 132, and in particular, mobile device 142 of authorized responder 132, is provisioned IAN information, such as one or more of an identifier associated with the IAN, for example, an identifier of AP 122 and any security information, such as a password, required for connecting to AP 122, wireless resource information, such as frequencies, time slots, or resource blocks, used for IAN communications, and local applications and services 127 available to visiting responders who are authorized by the local agency, such as routing information for registering with a registrar 128 of the local agency and for accessing local applications and services 127.

In response to second responder 133 arriving at the incident scene, authorized responder 132, and in particular first mobile device 142, identifies second responder 133 and second mobile device 143 at the incident scene. For example, second responder 133 may inform (406) authorized responder 132 that he/she has arrived at the incident scene. For example, second responder 133 may physically present himself/herself to authorized responder 132, or second responder 133 may convey, via mobile device 143, a short-range wireless signal indicating that second responder 133 has arrived at the incident scene.

Further, in response to arriving at the incident scene and if not already done, second responder 133 makes visual contact (408) with authorized responder 132, thereby allowing authorized responder 132 visually validate second responder 133, that is, to confirm an identity of second responder 133 and confirm that second responder 133 is a responder from the same visiting agency as authorized responder 132. In response to making visual contact with second responder 133 and visually validating second responder 133, authorized responder 132, and in particular mobile device 142 of the authorized responder, transfers (410) a second mutual aid token to second responder 133, which second mutual aid token is derived from the first mutual aid token 206 stored by authorized responder 132. The authorized responder transfers the second mutual aid token, which can be used by the second responder to access network 120 of the local agency, without first being required to contact the local agency or the visiting agency, that is, the home agency of visiting responders 132 and 133, to obtain permission to authorize the second responder to access network 120 or the local agency applications and services 127. In one such embodiment, the first and second mutual aid tokens are the same mutual aid token, that is, authorized responder 132 transfers the first, stored mutual aid token. In another such embodiment, the second mutual aid token may be a new mutual aid token 206 derived from the first mutual aid token, that is, generated by authorized responder 132 based on the first mutual aid token, which second mutual aid token includes a same permissions and limitations upon use as the first mutual aid token subject to any adjustments, such as in a transferability time period attribute, described herein.

Further, authorized responder 132, and in particular mobile device 142, conveys the IAN information to second responder 133. For example, authorized responder 132 may transfer the second mutual aid token and the IAN information from the authorized responder's mobile device 142 to the second responder's mobile device 143 via a near-field communication and the network interfaces 208 of each of mobile devices 142 and 143. Second responder 133 then stores (412), in the at least one memory device 204 of the second responder's mobile device, that is, second mobile device 143, the second mutual aid token and the IAN information received from authorized responder 132.

Based on the IAN information received from authorized responder 132, second responder 133, and in particular mobile device 143 of the second responder, joins (414) IAN 102, for example, connects to access node 122 or to any of the mobile devices 114-116 of the local responders 104-106 that may be acting as a relay device for the IAN. By joining IAN 102, second responder 133 is now able to access network 120. Subsequent to joining IAN 102, second responder 133, and in particular mobile device 143, then registers (416) with local registrar 128 by conveying, to the local registrar and via the IAN, the second mutual aid token and identifiers of user 133 and/or of mobile device 143.

In response to receiving, from mobile device 143, the second mutual aid token and identifiers of user 133 and/or mobile device 143, local registrar 128 registers user 133 and mobile device 143 with the local agency, stores the received identifiers of user 133 and/or mobile device 143, and conveys (418) a first application token 306 to second responder 133, and in particular to mobile device 143. Application token 306 authorizes mobile device 143 to access and utilize one or more local applications and services 127 of the local agency. That is, in response to receiving application token 306 from registrar 128, mobile device 143 registers (422) with an application or service 127 of the local agency by conveying the application token to the local application and/or service. In response to receiving application token 306, the local application or service 127 authorizes (424) mobile device 143 to access and utilize the application and/or service. In response to authorizing mobile device 143, the application and/or service 127 establishes (426) a traffic link with mobile device 143 via data network 122 and IAN 102 and exchanges traffic with the mobile device 143 via the established traffic link.

The first mutual aid token 206 may include, or otherwise be associated with, a transferability time period attribute, wherein the transferability time period is a time period during which the mutual aid token, or other mutual aid tokens derived from the mutual aid token, can be transferred from one mutual aid responder to another. That is, a transferability of the first mutual aid token 206 is time-limited, such that an ability to transfer the token among responders of a visiting agency is limited to a given time period, that is, the transferability time period.

For example, the first mutual aid token may include, and/or server 126 may maintain, the transferability time period attribute of the token, that is, the time period during which the first mutual aid token may be transferred among mutual aid responders. After an expiration of the transferability time period, the first mutual aid token, or mutual aid tokens derived, directly or indirectly, from the first mutual aid token, no longer are transferable. In one such embodiment, the transferability time period may be a specified time and/or date after which the token is no longer transferable. In another such embodiment, the transferability time period may be a length of time, such as in minutes, hours, or days. In the latter embodiment, a counter associated with local registrar 128, such as counter 310 of server 126, may be initialized, based on the transferability time period, when first mutual aid token 206 is provisioned to the authorized responder, that is, to user 132/mobile device 142. A processor associated with registrar 128, such as processor 302, then counts down the transferability time period associated with first mutual aid token 206. First mutual aid token 206, which may be used to access the home agency network, then may be transferred by a visiting agency responder to another visiting agency responder until the transferability time period expires, at which point the mutual aid token and any mutual aid tokens derived, directly or indirectly, from the first mutual aid token become untransferable. In yet another embodiment of the present invention, the transferability time period may vary based on a number of transfers, hops, or users of a mutual aid token or its derivative tokens. That is, rather than linearly counting down the expiration time period, the countdown may be more similar to a step function, wherein a remaining transferability time period of a mutual aid token is increased, that is, stepped up, or decreased, that is, stepped down, each time the mutual aid token, or its derivatives, is transferred.

In still another embodiment of the present invention, the first mutual aid token 206 additionally may include a token lifetime attribute, wherein after an expiration of a lifetime time period, the first mutual aid token, or mutual aid tokens derived, directly or indirectly, from the first mutual aid token, expires and can no longer be used to access the home agency network. This lifetime time period may be co-extensive with, or longer than, the transferability time period. That is, in one such embodiment, after expiration of the transferability time period, current possessors of the first mutual aid token 206 still may be able to use the first mutual aid token to access the home agency network so long as a lifetime time period associated with the token has not expired. However, if the lifetime time period has also expired, then current possessors of the first mutual aid token 206 also may no longer be able to use the first mutual aid token to access the home agency network.

In yet another embodiment of the present invention, the first mutual aid token 206 additionally may be a limited transfer, or limited hop, token. For example, the first mutual aid token 206 may be a single transfer, or a single hop, token wherein the token may be used by only one other user/mobile device than authorized user 132/authorized mobile device 142, for example, by second responder 133/mobile device 143, or the first mutual aid token 206 may be a multi-transfer, multi-hop, or multi-user token that may be transferred multiple times, for example, wherein one visiting agency user/mobile device may transfer the mutual aid token to another user/mobile device of the same visiting agency, so long as the transfers occur prior to expiration of the transferability time period. For example, in one such multi-transfer embodiment, the first mutual aid token may include attributes that limit a use of the mutual aid token, such as one or more of a maximum number of permissible transfers of the token, a maximum number of permissible hops of the token, or a maximum number of permissible users of the token before the transferability time period expires.

Each mutual aid token derived, directly or indirectly, from the first mutual aid token, such as the second mutual aid token or a third mutual aid token referred to below, then inherits the attributes of the first mutual aid token, such as the transferability time period, the token lifetime, and the transfer/hop/user limitations. For example, if a maximum number of permissible transfers of the first mutual aid token is 'three,' then the maximum number of permissible transfers of the second mutual aid token would be 'two,' and the maximum number of permissible transfers of the third mutual aid token, derived from the second mutual aid token, would be 'one,' that is, only one more mutual aid token can be derived from the third mutual aid token. Each such mutual aid token may include a remaining transfer/hop/user attribute that indicates a maximum number of remaining transfers/hops/users for that mutual aid token and any mutual aid tokens derived from that token.

In various embodiments of the present invention and as noted above, one or more of the attributes that limit a use of the first mutual aid token, such as the transferability time period, the lifetime time period, and/or the transfer or hop limitations, may be maintained by server 126 in addition to, or instead of, being included in the token. Further, server 126 may maintain, in at least one memory device 304, a counter 310 that is incremented by processor 302 each time the server receives a mutual aid token derived, directly or indirectly, from first mutual aid token 206 (or that is decremented by the processor, depending upon how server 126 keeps a count of a number of transfers/hops/users of the mutual aid token). In response to reaching a maximum number of transfers/hops/users, server 126 then may refuse to further accept the first mutual aid token or mutual aid tokens derived from the first mutual aid token.

For example, suppose after second responder 133 registers with registrar 128 and application/service 127, a third responder of the visiting agency, such as user 134 and corresponding mobile device 144 (collectively referred to herein as 'third responder 134'), arrives (428) at incident scene 150. In response to third responder 134 arriving at the incident scene, second responder 133, and in particular second mobile device 143, identifies third responder 134 and third mobile device 144 at the incident scene. For example, in response to arriving at incident scene 150, third responder 134 may inform (430) second responder 133 that he/she has arrived at the incident scene. For example, third responder 134 may physically present himself/herself to second responder 133, or third responder 134 may convey, via mobile device 144, a short-range wireless signal indicating that third responder 134 has arrived at the incident scene.

Further, in response to arriving at the incident scene and if not already done, third responder 134 makes visual contact (432) with second responder 133, thereby allowing second responder 133 visually validate third responder 134, that is, to confirm an identity of third responder 134 and that third responder 134 is a responder from the same visiting agency as second responder 133. In response to making visual contact with third responder 134 and visually validating third responder 134, second responder 133, and in particular mobile device 143 of the second responder, transfers (434) a third mutual aid token to third responder 134, which third mutual aid token is derived from the second mutual aid token stored by the second responder 133. Second responder 133 transfers the third mutual aid token, which can be used by the third responder to access network 120 of the local agency, without first being required to contact first responder 132, the local agency, or the visiting agency, that is, the home agency of visiting responders 132, 133, and 134, to obtain permission to authorize the third responder to access network 120 or the local agency applications and services 127. In one such embodiment, the third mutual aid token may be the same token as the second mutual aid token stored by second responder 133. In another such embodiment, the third mutual aid token may be a new mutual aid token generated by second responder 133 based on the stored, second mutual aid token, which new mutual aid token includes the same permissions and limitations upon use as the second mutual aid token, and correspondingly, as the first mutual aid token.

Further, second responder 133, and in particular mobile device 143, conveys the IAN information to third responder 134. For example, second responder 133 may transfer the third mutual aid token and the IAN information from the second responder's mobile device 143 to the third responder's mobile device 144 via a near-field communication and the network interfaces 208 of each of mobile devices 143 and 144. Third responder 134 then stores (436) the third mutual aid token and the IAN information received from second responder 133 in the at least one memory device 204 of the third responder's mobile device, that is, mobile device 144.

Based on the IAN information received from second responder 133, third responder 134, and in particular mobile device 144 of the third responder, joins (438) IAN 102, for example, connects to access node 122 or to any of the mobile devices 114-116 of the local responders 104-106 that may be acting as a relay device for the IAN. By joining IAN 102, third responder 134 is now able to access network 120. Subsequent to joining IAN 102, third responder 134, and in particular mobile device 144, then registers (440) with local registrar 128 by conveying, to the local registrar and via the IAN, the third mutual aid token and identifiers of user 134 and/or mobile device 144.

In response to receiving, from mobile device 144, the third mutual aid token 206 and identifiers of user 134 and/or mobile device 144, local registrar 128 registers user 134 and mobile device 144 with the local agency, stores the received identifiers of user 134 and/or mobile device 144, and provides (442) a second application token 308 to mobile device 144. Second application token 308 authorizes mobile device 144 to access and utilize one or more local applications and services 127 of the local agency. That is, in response to receiving second application token 308 from registrar 128, mobile device 144 registers (444) with a local application or service 127 by conveying second application token 308 to the local application and/or service. In response to receiving the second application token, the local application or service 127 authorizes (446) mobile device 144 to access and utilize the local application and/or service. In response to authorizing mobile device 144, the local application and/or service 127 establishes (448) a traffic link with mobile device 144 via data network 122 and IAN 102 and exchanges traffic with the mobile device 144 via the established traffic link. Signal flow diagram 400 then ends.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing local service to a visiting responder in a public safety wireless communication system, the method comprising:

maintaining, by a first mobile device of a first responder associated with a visiting agency and present in a geographical jurisdiction of a local agency different from the visiting agency, a first mutual aid token associated with the local agency, wherein the first mutual aid token authorizes the first responder to access the local agency and wherein the first mutual aid token is associated with a transferability time period, wherein the transferability time period is a time during which the first mutual aid token, or other mutual aid tokens derived from the first mutual aid token, can be transferred from one mutual aid responder to another; identifying, by the first mobile device, a second mobile device of a second responder associated with the visiting agency and present in the geographical jurisdiction of a local agency; and transferring, by the first mobile device to the second mobile device and without a need to contact the local agency subsequent to identifying the second responder, a second mutual aid token that is derived from the first mutual aid token, wherein the second mutual aid token authorizes the second responder to access the local agency.

2. The method of claim 1, further comprising:
conveying, by the second mobile device to a network element of the local agency and over an incident area network, the second mutual aid token;
in response to conveying the second mutual aid token, receiving, by the second mobile device from the local agency, an application token; and
accessing, by the second mobile device and via the incident area network, one or more of an application and a service of the local agency based on the application token.

3. The method of claim 2, further comprising:
in response to accessing one or more of an application and a service of the local agency, establishing, by the second mobile device, a traffic link with the one or more of the application and the service of the local agency.

4. The method of claim 1, wherein the first mutual aid token and the second mutual aid token are the same mutual aid token.

5. The method of claim 1, wherein transferring the second mutual aid token comprises:
generating, by the first mobile device, a new mutual aid token based on the first mutual aid token, wherein the second mutual aid token inherits the transferability time period of the first mutual aid token; and
in response to identifying the second responder, transferring, by the first mobile device to the second mobile device, the new mutual aid token without a need to contact a home agency of the first responder.

6. The method of claim 1, wherein the first mutual aid token is associated with one or more attributes comprising one or more of a maximum number of transfers, a maximum number of hops, a maximum number of users, and a time period before the mutual aid token expires and wherein the second mutual aid token inherits the one or more attributes of the first mutual aid token.

7. The method of claim 1, wherein a network element of the local agency maintains one or more attributes associated with the first mutual aid token, which one or more attributes comprises one or more of a maximum number of transfers, a maximum number of hops, and a maximum number of users of the first mutual aid token.

8. The method of claim 1, further comprising:
identifying, by the second mobile device, a third mobile device of a third responder associated with the visiting agency and present in the geographical jurisdiction of the local agency; and
in response to identifying the third responder, transferring, by the second mobile device to the third mobile device and without a need to contact the first responder or a home agency of the second responder, a third mutual aid token that is derived from the second mutual aid token, wherein the third mutual aid token authorizes the third mobile device to access the local agency.

9. The method of claim 8, wherein the first mutual aid token is associated with one or more attributes comprising one or more of a maximum number of transfers, a maximum number of hops, and a maximum number of users, and wherein each of the second mutual aid token and the third mutual aid token inherits the one or more attributes of the first mutual aid token.

10. An apparatus for providing local service to a visiting responder in a public safety wireless communication system, the apparatus comprising:
a first mobile device comprising: a processor; an at least one memory device that wherein the at least one memory device is configured to store a set of instructions that, when executed by the processor, cause the processor to perform the following functions when the first mobile device is present in a geographical jurisdiction of a local agency, wherein the local agency is different from a visiting agency associated with a first responder using the first mobile device: maintain a first mutual aid token associated with the local agency, wherein the first mutual aid token authorizes the first mobile device to access the local agency and wherein the first mutual aid token is associated with a transferability time period, wherein the transferability time period is a time during which the first mutual aid token, or other mutual aid tokens derived from the first mutual aid token, can be transferred from one mutual aid responder to another; identify a second mobile device of a second responder associated with the visiting agency and present in the geographical jurisdiction of a local agency; and transfer, to the second mobile device and without a need to contact the local agency subsequent to identifying the second responder, a second mutual aid token that is derived from the first mutual aid token, wherein the second mutual aid token authorizes the second responder to access the local agency.

11. The apparatus of claim 10, wherein the apparatus further comprises the second mobile device and wherein the second mobile device is configured to:
convey, to a network element of the local agency and over an incident area network, the second mutual aid token;
in response to conveying the second mutual aid token, receive an application token; and
access, via the incident area network, one or more of an application and a service of the local agency based on the application token.

12. The apparatus of claim 11, wherein the second mobile device is configured to:
in response to accessing one or more of an application and a service of the local agency, establish a traffic link with the one or more of the application and the service of the local agency.

13. The apparatus of claim 10, wherein the first mutual aid token and the second mutual aid token are the same mutual aid token.

14. The apparatus of claim 10, wherein the at least one memory device further is configured to store a set of instructions that, when executed by the processor, cause the processor to transfer the second mutual aid token by:
generating a new mutual aid token based on the first mutual aid token, wherein the second mutual aid token inherits the transferability time period of the first mutual aid token; and
in response to identifying the second responder, transferring, by the first mobile device to the second mobile device, the new mutual aid token without a need to contact a home agency of the first responder.

15. The apparatus of claim 10, wherein the first mutual aid token is associated with one or more attributes comprising one or more of a maximum number of transfers, a maximum number of hops, a maximum number of users, and a time period before the mutual aid token expires and wherein the second mutual aid token inherits the one or more attributes of the first mutual aid token.

16. The apparatus of claim 10, further comprising a network element of the local agency, wherein the network element is configured to:
   maintain one or more attributes associated with the first mutual aid token, which one or more attributes comprises one or more of a maximum number of transfers, a maximum number of hops, and a maximum number of users of the first mutual aid token.

17. The apparatus of claim 10, wherein the apparatus further comprises the second mobile device and wherein the second mobile device is configured to:
   identify a third mobile device of a third responder associated with the visiting agency and present in the geographical jurisdiction of the local agency; and
   in response to identifying the third responder, transfer, to the third mobile device and without a need to contact the first responder or a home agency of the second responder, a third mutual aid token that is derived from the second mutual aid token, wherein the third mutual aid token authorizes the third mobile device to access the local agency.

18. The apparatus of claim 17, wherein the first mutual aid token is associated with one or more attributes comprising one or more of a maximum number of transfers, a maximum number of hops, and a maximum number of users, and wherein each of the second mutual aid token and the third mutual aid token inherits the one or more attributes of the first mutual aid token.

\* \* \* \* \*